United States Patent [19]

Rinker et al.

[11] 4,333,779

[45] Jun. 8, 1982

[54] APPARATUS AND PROCESS FOR MANUFACTURING BIO-OXIDATION AND NITRIFICATION MODULES

[75] Inventors: William R. Rinker; Harry R. Ayers; John W. Miller, all of Cuyahoga Falls, Ohio

[73] Assignee: The B. F. Goodrich Company, Akron, Ohio

[21] Appl. No.: 236,967

[22] Filed: Feb. 23, 1981

[51] Int. Cl.$^3$ .................. B06B 3/00; B23K 19/04; B30B 15/34; B32B 31/20
[52] U.S. Cl. .................. 156/73.1; 156/182; 156/210; 156/292; 156/580.1; 156/583.1; 228/1 B
[58] Field of Search .................. 156/73.1, 182, 210, 156/290, 292, 308.4, 563, 580.1, 580.2, 583.1; 228/1 R, 1 B, 110

[56] References Cited

U.S. PATENT DOCUMENTS

| | | | |
|---|---|---|---|
| 2,405,527 | 8/1946 | Skolnik | 156/182 |
| 3,445,307 | 5/1969 | Balamuth et al. | 156/580.1 |
| 3,545,062 | 12/1970 | Cox | 156/182 |
| 3,733,238 | 5/1973 | Long et al. | 156/580.1 |
| 4,132,581 | 1/1979 | Swartz | 156/210 |

Primary Examiner—Michael G. Wityshyn
Attorney, Agent, or Firm—James R. Lindsay

[57] ABSTRACT

The present invention provides apparatus and a process for manufacturing a bio-oxidation and nitrification module useful in treating sewage and industrial wastewater. Paired thermoplastic flat sheet and corrugated sheet are nested in a cradle and advanced beneath a bank of ultrasonic welders to produce a sonic weld along those interfacial zones of the sheets which are in contact. Welded units of flat and corrugated sheets are stacked to a height equal to the height of the module and the edges of opposite sides of the stack are softened by heated platens to form an edge-seam which bonds the welded units together to form the finished module.

6 Claims, 8 Drawing Figures

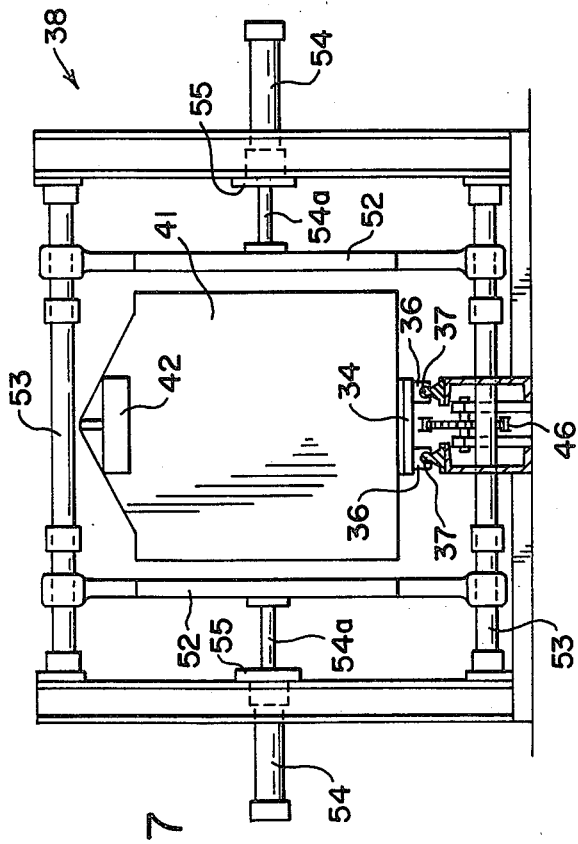
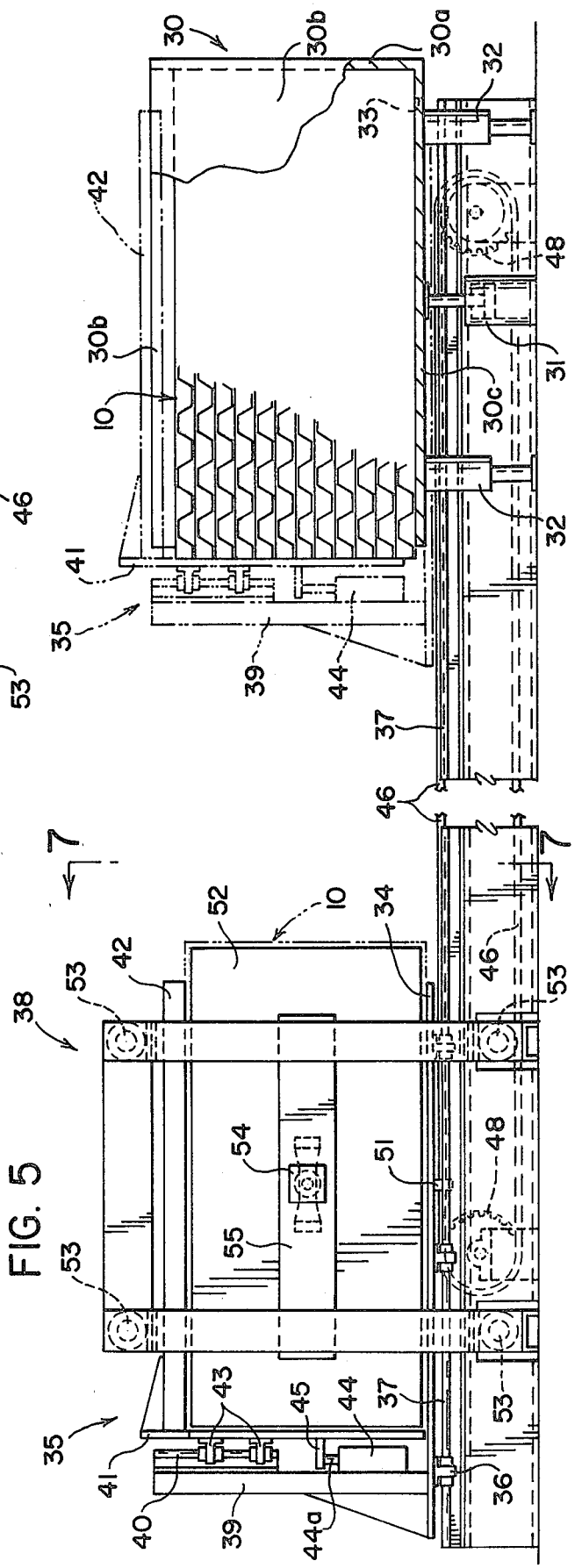
FIG. 7
FIG. 5

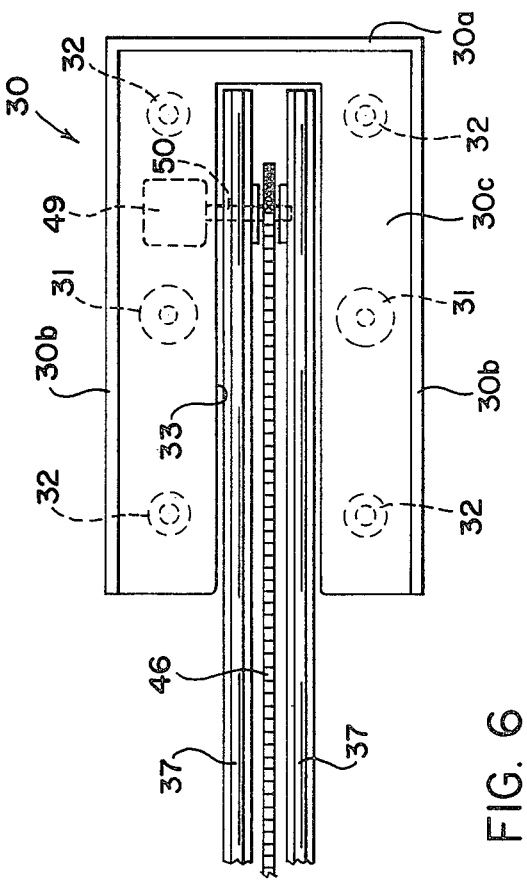
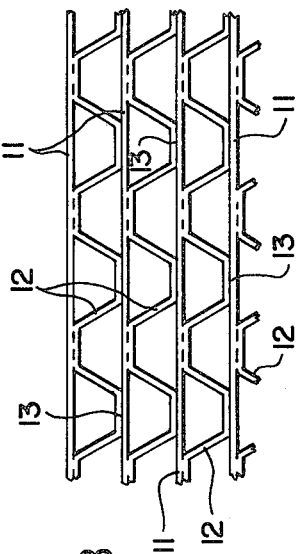
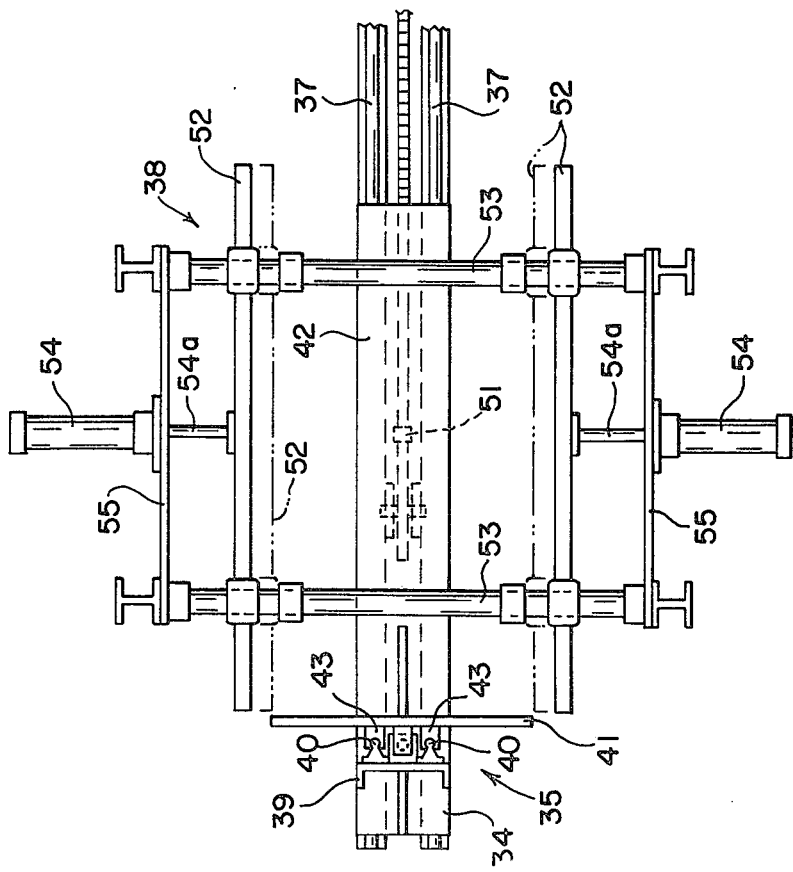
FIG. 6
FIG. 8

APPARATUS AND PROCESS FOR MANUFACTURING BIO-OXIDATION AND NITRIFICATION MODULES

BACKGROUND OF THE INVENTION

The present invention relates to bio-oxidation and nitrification modules useful in the treatment of sewage and industrial wastewater and pertains more particularly to apparatus and a process for manufacturing such modules.

The bio-oxidation and nitrification of sewage and industrial wastewater normally is carried out in towers that are "packed" with treatment modules that provide a large surface area upon which micro-organisms can grow. For a number of years, such treatment towers usually were filled with rocks having an average diameter of about 5 to 10 centimeters over which the sewage or industrial wastewater was "trickled". The aerobic bacterial growth that formed on the surface of the rocks converted organic material and inorganic nutrients in the wastewater into relatively stable products (such as biological solids, carbon dioxide, nitrates and nitrites). The solid materials are removed from the treated wastewater before the wastewater is treated further or returned to the environment.

In more recent times, the rock packing in the treatment towers has been replaced with treatment media in the form of modules comprised of alternating flat and corrugated sheets. The sheets usually are made of rigid plastic material, such as polyvinyl chloride, polyethylene, polypropylene or polystyrene. A typical module is about 60 centimeters wide, about 120 centimeters long, and about 60 centimeters high. A number of modules are stacked on top of each other within the tower, the stacked modules often reaching a height of 10 to 15 meters. The thickness of the sheets and their rigidity must be sufficient to withstand collapse during normal use of the treatment tower. The corrugations of the corrugated sheets usually extend across essentially the entire dimension of the sheet and preferably are sinuous to avoid straight "fall-through" of the wastewater through the module.

In the fabrication of such modules, "solvent bonding" has been used extensively to produce a strong bond between adjacent flat and corrugated sheets of the module. To achieve the bond, a volatile solvent for the plastic from which the sheets are formed is applied to the interfacing surfaces of the sheets, the solvent softening the interfacing surfaces of the sheets. The assembly of alternating flat and corrugated sheets is placed under a slight pressure so that the softened interfacing surfaces are held in contact with each other until the solvent evaporates from the surfaces. Fusion of the contacting interfacing surfaces occurs upon the evaporation of the solvent from the plastic. Many of the solvents which are useful for solvent bonding, however, are believed to be hazardous to the health of persons who are exposed over prolonged periods of time to the solvent. As a consequence, it has been suggested that alternate methods of forming the modules be sought.

SUMMARY OF THE INVENTION

The present invention provides apparatus and a process for manufacturing modules useful for bio-oxidation and nitrification treatment of sewage and industrial wastewater that eliminates the use of solvent in the assembly of the module. In accordance with the present invention, a module is formed by joining together a flat sheet and a corrugated sheet by sonic welding to form a component of the module and stacking a number of such components one on top of another until a stack of the desired height to form the module is obtained. The edges of the components on opposite sides of the stack then are heat-flanged together to form a composite structure.

The apparatus for manufacturing the module includes a sonic welding station for joining together a flat sheet and a corrugated sheet of the module, a stacking station at which welded flat sheet-corrugated sheet components are loaded into an assembly bin until a stack of components of the desired height is obtained, and a station at which the edges of the components on opposite sides of the stack are joined together by heatseaming.

DESCRIPTION OF THE DRAWINGS

FIG. 5 is a side elevation view of the assembly bin, carriage unit and edge-flanging unit forming components of the apparatus of the present invention;

FIG. 6 is a plan view of the apparatus shown in FIG. 5;

FIG. 7 is a section taken on line 7—7 of FIG. 5; and

FIG. 8 is a fragmentary side elevation view of a module formed in accordance with the present invention.

DETAILED DESCRIPTION OF THE INVENTION

Figure 1:
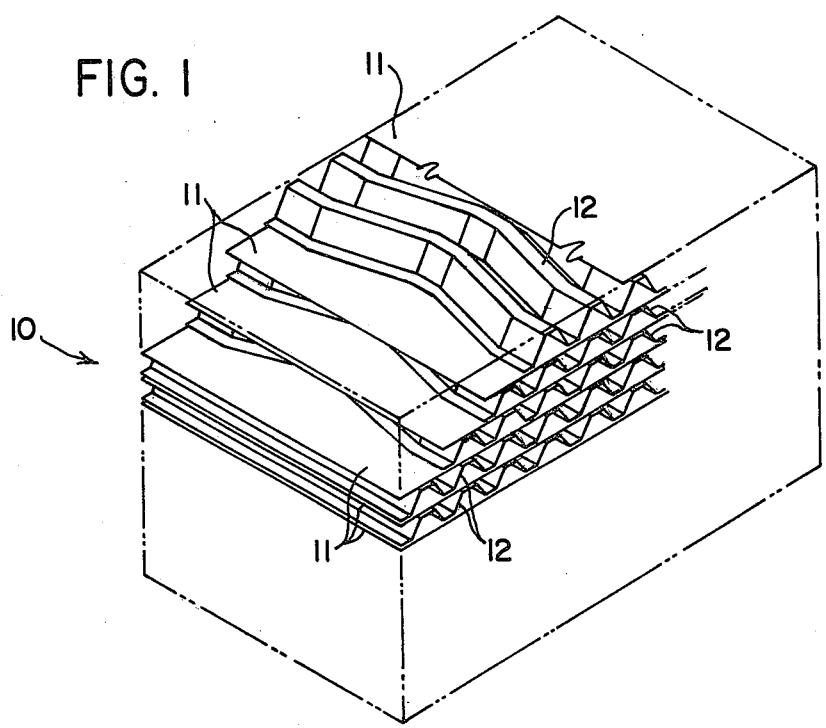
FIG. 1 is a schematic perspective view, partially shown in phantom, of a module comprised of alternating flat and corrugated plastic sheets formed in accordance with the present invention.

A bio-oxidation and nitrification module 10 constructed in accordance with the present invention is illustrated schematically in FIG. 1. Module 10 is comprised of alternating flat plastic sheets 11,11 and corrugated plastic sheets 12,12 with the flat sheets 11,11 and corrugated sheets 12,12 being paired and joined by a sonic weld along the zones of contact between the paired sheets 11 and 12 to form separate components each comprised of a flat sheet 11 and a corrugated sheet 12. The said paired components are stacked on top of each other to the desired height and are joined together by heat-flanging the edges of the components of the module 10 on opposite sides of the module 10 to form an edge-seam identified by numeral 13 in FIG. 8, as will be explained in more detail hereinafter.

Flat sheets 11,11 and corrugated sheets 12,12 may be fabricated of any thermoplastic material that has a suitable rigidity and is capable of being joined together by heat-sealing. Suitable plastic materials include polyvinyl chloride homopolymers, polyvinyl chloride copolymers (such as polyvinyl chloride-polyvinyl acetate copolymer and poly-vinyl chloride-polyvinylidene chloride copolymer), polyvinylidene chloride homopolymer, polypropylene, high-density polyethylene, chlorinated polyvinyl chloride homopolymer, chlorinated low-density polyethylene, chlorinated high-density polyethylene, polymethyl methacrylate, polystyrene, and polyoxymethylene polymers and copolymers. The thickness of sheets 11,11 and sheets 12,12 may vary. Usually, thicker sheets are used in modules that are to be positioned near the bottom of the treatment tower, since these modules will be required to support a greater load than those modules positioned near the top of the tower. Typically, the thickness of the flat sheets 11,11 will be from 15 to 40 mils thick and the thickness of the corrugated sheets 12,12 will be from 15 to 70 mils thick.

Figure 2:
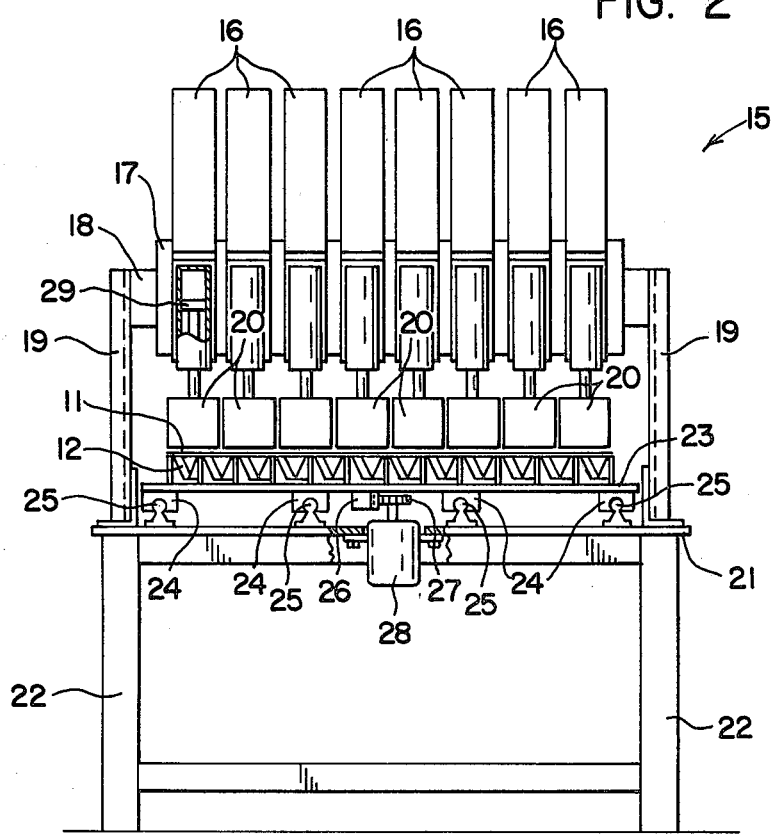
FIG. 2 is a front elevation view of a sonic welding unit forming a component of the apparatus of the present invention.
Figure 3:
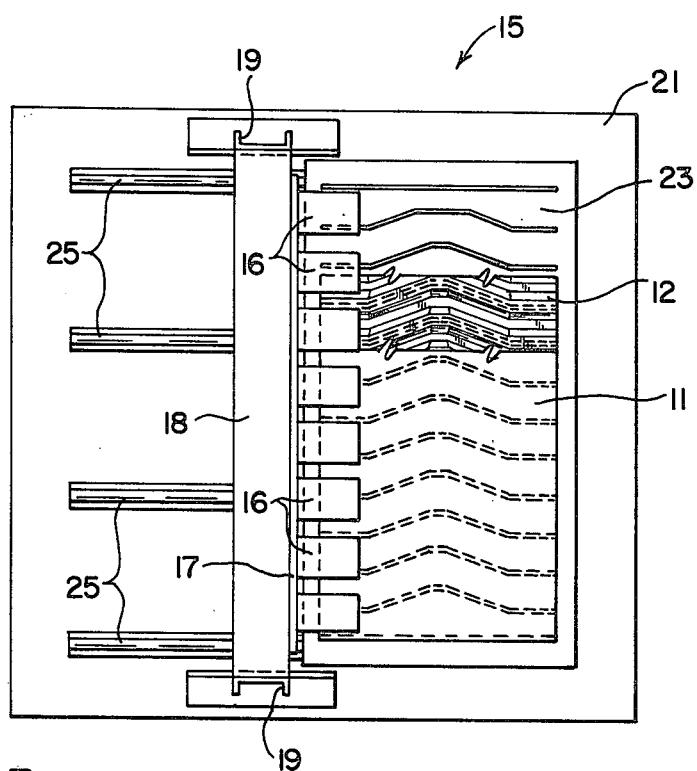
FIG. 3 is a plan view of the sonic welding unit shown in FIG. 2.
Figure 4:
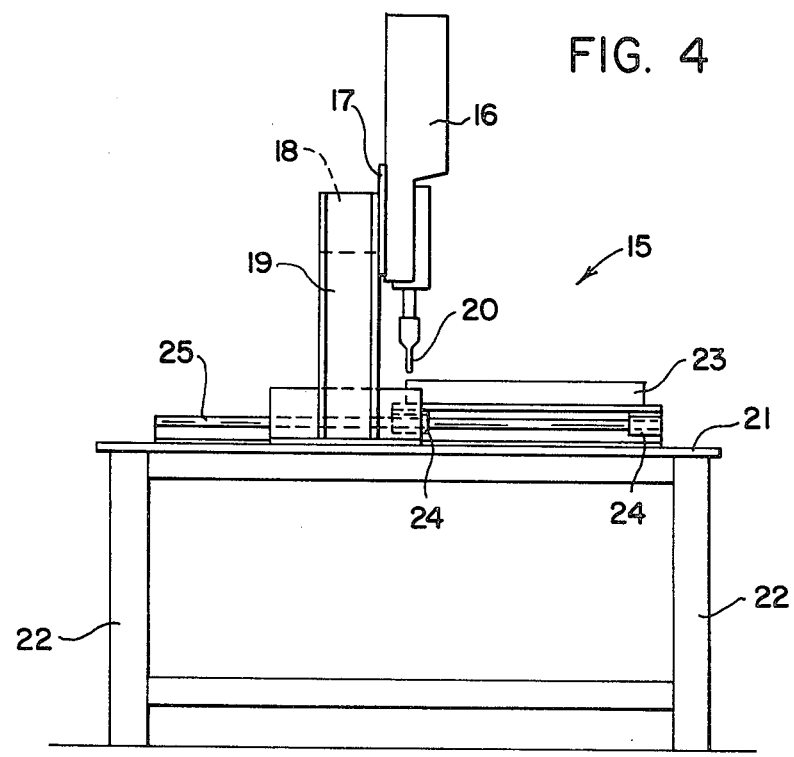
FIG. 4 is a side elevation view of the sonic welding unit shown in FIG. 2.

The sonic welding of a flat sheet 11 and a corrugated sheet 12 is accomplished by assembling a flat sheet 11 and corrugated sheet 12 together, one on top of the other, and advancing the assembly through apparatus capable of producing a sonic weld along areas of interfacial contact between the assembled sheet 11 and sheet 12, such as the sonic welding apparatus 15 shown in FIGS. 2, 3, and 4.

Referring to FIGS. 2, 3 and 4, sonic welding apparatus 15 comprises a bank of ultrasonic welder units 16,16 supported in a closely aligned position on support bar 17 rigidly secured to cross support 18 which is mounted on vertical supports 19,19. Ultrasonic welder units 16,16 may be commercially available units (for example, Ultrasonic Welder Model No. 1120P produced by Branson Sonic Power Company, Danbury, Conn., which converts 220-250 volt, 60 Hz current to 20 kHz electrical energy which electrical energy then is converted into mechanical vibratory energy of ultrasonic frequency that is transmitted through the horn 20 of each welder unit 16 to the workpieces to be joined). Supports 19,19 are secured to table top 21 which is supported on legs 22,22.

A cradle 23 has a top contoured surface that has essentially the same configuration as the corrugated sheet 12 of module 10 so that a corrugated sheet 12 can be fit into cradle 23 with the bottom face of sheet 12 in contact with and supported by the top surface of cradle 23. Cradle 23 is supported by block guides 24,24 slidably mounted on rod guides 25,25 secured to table top 21, allowing cradle 23 to be moved from one side of the bank of sonic welder units 16,16, beneath the bank of welder units 16,16, to the other side of the bank of welder units 16,16, and then back again at a controlled speed. Movement of cradle 23 is accomplished through use of a conventional gear rack 26 affixed to the bottom of cradle 23 and a spur gear 27 driven at a constant speed by a reversible motor 28 mounted with table top 21 (shown schematically in FIG. 2).

A paired sheet 11 and sheet 12 are joined together by fitting a corrugated sheet 12 into cradle 23 and placing a flat sheet 11 on top of sheet 12 (as is shown in FIG. 3). Motor 28 is energized to cause cradle 23 (with sheets 11 and 12 positioned thereupon) to be advanced by spur gear 27 and gear rack 26 beneath the bank of welder units 16,16. Horns 20,20 of welder units 16,16 are slidably mounted to permit horns 20,20 to be resiliently urged against the top surface of sheet 11 as sheets 11 and 12 are advanced beneath welder units 16,16 by adjustment of the pressure of the air maintained above piston 29 in each welder unit 16,16. The pressure of the air above piston 29 in each welder unit 16,16 is adjusted by a conventional air regulator system (not shown). The resilient urging of horns 20,20 against sheet 11 causes sheet 11 to be held in close contact with sheet 12 so that a sonic weld is formed along the contacting zones of sheets 11 and 12 as they are advanced beneath welder units 16,16 and mechanical energy of ultrasonic frequency is transmitted from horns 20,20 through sheets 11 and 12 and into cradle 23.

After cradle 23 has been advanced beyond the bank of welder units 16,16, motor 28 is deenergized. Sheets 11 and 12 which now have been joined along their interfacial contacting zones are removed from cradle 23 and another sheet 11 and sheet 12 are placed in cradle 23. Motor 28 is reversed and re-energized to advance cradle 23 (with sheets 11 and 12 positioned thereon) once again beneath the bank of welder units 16,16 to produce a sonic weld along these interfacial contacting zones of sheets 11 and 12 as they advance beneath welder units 16,16. The sequence is repeated to produce more components (each comprised of a flat sheet 11 welded with a corrugated sheet 12) for assembly into module 10.

The welded components as they are lifted from cradle 23 are stacked one on top of another, while maintaining an alternating flat and corrugated sheet arrangement, within assembly bin 30 comprised of back wall 30a, side walls 30b, 30b and floor 30c until a stack (of components) of the desired height to form module 10 is realized. As shown in FIG. 5, floor 30c of assembly bin 30 is supported by hydraulically-operated piston-supports 31,31 which permit the assembly bin 30 to be raised or lowered, as will be explained in more detail hereinafter. Telescoping guides 32,32 secured to floor 30c and to the ground prevent the assembly bin 30 from being displaced laterally while allowing floor 30c to be raised and lowered. Floor 30c of assembly bin 30 is "cut-out" to form a channel or opening 33 of a size sufficient to permit platform 34 of carriage 35 to slide in and out of the opening 33 without contacting floor 30c.

Platform 34 of carriage 35 is secured to and supported on block guides 36,36 that are slidably mounted on rod guides 37,37 that extend between assembly bin 30 and edge-flanger unit 38 and permit carriage 35 to be moved into and between assembly bin 30 and edge-flanger unit 38 (as will be explained in more detail hereinafter). A vertical support member 39 is rigidly secured at the back end of platform 34 with vertically disposed rod guides 40,40 secured thereto. A clamping unit comprised of a vertical component 41 and horizontal arm 42 extending parallel to, but spaced from, platform 34 has block guides 43,43 secured one above the other to vertical component 41. Block guides 43,43 engages rod guides 40,40 permitting vertical movement of the clamping unit in response to a fluid-controlled piston unit 44, the piston rod 44a thereof being secured to bracket 45 which is rigidly secured to component 41 of the clamping unit of carriage 35. Carriage 35 is moved from a position within assembly bin 30 (as shown in phantom lines in FIG. 5) to a position within edge-flanger unit 38 and to an intermediate position between assembly bin 30 and edge-flanger unit 38 by a chain-and-sprocket drive system comprised of a drive chain 46 traveling around sprocket wheels 48,48. A reversible motor 49 drives drive chain 46 through shaft 50 to which the sprocket wheel is keyed. Drive chain 46 is secured to bracket 51 which, in turn, is secured to platform 34 of carriage 35 whereby movement of drive chain 46 around sprocket wheels 48,48 causes movement of carriage 35 along rod guides 37,37.

Edge-flanger unit 38 comprises opposed spaced-apart electric heating platens 52,52 mounted on rod guides 53,53 for movement toward and away from one another, the movement of platens 52,52 inwardly or outwardly being controlled by the operation of fluid-operated piston units 54,54 which are secured to platens 52,52 through the respective piston rods 54a,54a of piston units 54,54 and to supports 55,55. Platens 52,52 are spaced farthest apart while a stack of welded flat sheet 11—corrugated sheet 12 components are conveyed into the edge-flanger unit 38 by carriage 35. When the carriage 35 is in position within edge-flanger unit 38, piston units 54,54 are energized and move platens 52,52 slowly toward each other and toward the stack of flat sheet 11—corrugated sheet 12 components supported within carriage 35. Movement of platens 52,52 toward one another is continued until platens 52,52 contact the edges of the stacked sheets 11 and 12 and, thereafter movement of each platen is continued for a distance of from about 6 to 15 millimeters (illustrated by phantom lines in FIG. 6). Platens 52,52 are heated to a temperature above the softening temperature of the thermoplastic material from which sheets 11,11 and sheets 12,12 are formed, so that platens 52,52 cause the material at the edges of sheets 11,11, 12,12 to soften sufficiently to deform and form the flanged edge-seam 13 thereby uniting all of the sheets 11,11, 12,12 of module 10 together. To prevent the plastic material from which sheets 11,11 and sheets 12,12 is formed from sticking to platens 52,52, the opposing faces of platens 52,52 which contact sheets 11,11, 12,12 desirably have a surface formed of a material which does not adhere to the plastic from which sheets 11 and 12 are formed (for example, the opposing faces of platens 52,52 may have a coating of a tetrafluorethylene fluorocarbon polymer or a fluorinated ethylene-propylene resin commercially available as Teflon coating material). Alternatively, a sheet or blanket of a material which will not stick to the platen or to the plastic from which sheets 11,11, 12,12 are formed is interposed between each platen 52,52 and the stack of sheets 11,11 12,12 before platens 52,52 are moved in contact with the stack of sheets 11,11, 12, 12 to form the edge-seam 13. When the edge-seam 13 has been formed, the action of piston units 54,54 is reversed and platens 52,52 are moved away from each other allowing carriage 35 to be withdrawn from the edge-flanger unit 38 by reversing motor 49 causing drive chain 46 to move in the direction to effect withdrawal of carriage 35 from edge-flanger unit 38.

In the manufacture of a module 10 utilizing the apparatus described above, a corrugated thermoplastic sheet 12 is fitted into cradle 23 of the sonic welder unit 15 and a flat thermoplastic sheet 11 is placed on top of the corrugated sheet 12, as described above. Ultrasonic welder units 16,16 are energized and the air pressure above piston 29 of each unit 16,16 is regulated to resiliently urge horns 20,20 against sheet 11 and sheet 12 as sheets 11 and 12 are advanced beneath welder units 16,16 with sufficient force to maintain sheets 11 and 12 in contact with each other and to maintain sheet 12 cradled in cradle 23. Motor 28 is energized to advance cradle 23 (with sheets 12 and 11 nested thereupon) beneath the bank of welder units 16,16. After cradle 23 has been advanced beyond the bank of welder units 16,16, motor 28 is de-energized and "reversed". The paired flat sheet 11 and corrugated sheet 12 (which have become welded together along the interfacial zones of sheets 11 and 12 that are in contact during their advance beneath welder units 16,16) are removed from cradle 23 of the welder apparatus 15 and stacked in assembly bin 30. A second corrugated sheet 12 is fitted into cradle 23 and a flat sheet 11 is positioned on top of sheet 12. Motor 28 again is energized which causes cradle 23 to return to its original position, passing beneath the bank of welder units 16,16 in so doing which causes the sheets 11 and 12 in cradle 23 to be welded together along their interfacial contact zones. When cradle 23 has been returned to its original position, motor 28 once again is de-energized and reversed. The welded flat sheet 11-corrugated sheet 12 component thus formed is lifted from cradle 23 and is stacked on top of the previously welded sheet 11-sheet 12 component in assembly bin 30. The operation is repeated until a stack of such components of desired height is assembled in assembly bin 30. During the period of loading assembly bin 30 with such components, carriage 35 normally is positioned at a location between assembly bin 30 and edge-flanger unit 38 at a module unloading station.

After assembly bin 30 has a sufficient number of welded sheet 11-sheet 12 components stacked therein to form module 10, assembly bin 30 is moved upwardly by activating piston units 31,31 a distance sufficient to allow movement of platform 34 of carriage 35 to be moved into opening 33 of floor 30c of assembly bin 30 and beneath the stacked sheet 11-sheet 12 components within assembly bin 30. Motor 49 is energized to activate the chain-and-sprocket drive system (comprised of drive chain 46 and sprocket wheels 48,48) and move carriage 38 into assembly bin 30 (as illustrated by phantom lines in FIG. 5). Once carriage 35 has been moved into assembly bin 30, motor 49 is deenergized and reversed. Assembly bin 30 is lowered to its original position by reversing the action of piston units 31,31 which causes the stack of welded sheet 11-sheet 12 components to rest on platform 34 of carriage 35. Piston unit 44 then is activated to lower the clamping unit of carriage 35 unit until arm 42 of the clamping unit contacts the stack of welded sheet 11-sheet 12 components resting on platform 34 of carriage 35. Motor 49 again is energized and the chain-and-sprocket drive system moves carriage 35 (with the stack of welded sheet 11-sheet 12 components clamped therein) into the edge flanger unit 38, as shown in FIGS. 5, 6 and 7. Motor 49 is de-energized and reversed when carriage 35 is in place within edge-flanger unit 38. Piston units 54,54 then are activated to cause platens 52,52 to move toward each other, contact the stack of sheet 11-sheet 12 components and form the edge-seam or flange 13 as explained above. Piston units 54,54 then are activated to move platens 52,52 away from each other to their original positions. Motor 49 once again is energized to activate the chain-and-sprocket drive system and move carriage 35 with completed module 10 clamped therein to an unloading position intermediate edge-flanger unit 38 and assembly bin 30. Motor 49 is de-energized to maintain carriage 35 in such intermediate position. Piston unit 44 is activated to raise the clamping unit of carriage 35 and allow the completed module 10 to be removed from the carriage 35.

With the foregoing disclosure in mind, many and varied obvious modifications of this invention will become readily apparent.

We claim:

1. Apparatus for manufacturing a bio-oxidation and nitrification module composed of alternating flat thermoplastic sheets and corrugated thermoplastic sheets joined together to form a unitary structure, said apparatus comprising sonic welding means for ultrasonically welding together a paired flat sheet and corrugated sheet of said module along their interfacial zones of contact, assembly means for receiving paired welded flat sheet-corrugated sheet components from said sonic welding means and maintaining said components in stacked relation, edge-flanger means for flanging the edges of a stack of said paired welded flat sheet-corrugated sheet components to form an edge-seam which unites the said components together and forms the unitary module structure, and carriage means for moving a stack of paired welded flat sheet-corrugated sheet components from said assembly means along a predetermined path into said edge-flanger means, said sonic welding means including:

(a) a cradle having its upper face contoured to receive one of said corrugated sheets with one of said flat sheets disposed thereupon,
(b) a bank of sonic welder units,
(c) means for moving said cradle beneath said bank of sonic welder units, and
(d) means for resiliently maintaining said welder units against the upper face of said flat sheet disposed upon said corrugated sheet nested in said cradle as said cradle is advanced beneath said bank of sonic welder units along a predetermined path.

2. The apparatus of claim 1 in which said carriage means includes clamping means for retaining a stack of paired welded flat sheet-corrugated sheet components in stacked relationship as said stack of paired welded flat sheet-corrugated sheet components are moved from said assembly means into said edge-flanger means and during the forming of said edge-seam by said edge-flanger means.

3. The apparatus of claims 1 or 2 in which said carriage means is moved along said predetermined path by a chain-and-sprocket drive system.

4. The apparatus of claims 1 or 2 in which said edge-flanger means includes a pair of opposed spaced-apart electric heating platens mounted for movement toward and away from one another and means for moving said platens toward one another a distance sufficient to cause an edge-seam to be formed along opposite sides of a stack of paired welded flat sheet-corrugated sheet components positioned within said edge-flanger means and for moving said platens away from one another out of contact with said stack of paired flat sheet-corrugated sheet components positioned within said edge-flanger means.

5. The apparatus of claim 1 in which said assembly means includes a floor and means for raising and lowering said floor.

6. A process for making a bio-oxidation and nitrification module composed of alternating flat thermoplastic sheets and corrugated thermoplastic sheets, said process comprising:

(a) pairing together one of said flat sheets and one of said corrugated sheets used in said module and sonic welding said paired sheets together along their zones of interfacial contact by transmitting mechanical vibratory energy of ultrasonic frequency through said paired sheets while said paired sheets are maintained in physical contact,
(b) forming additional sonic-welded flat sheet-corrugated sheet components,
(c) stacking said sonic-welded flat sheet-corrugated sheet components one on top of another while maintaining an alternating flat sheet-corrugated sheet arrangement until a stack of said flat sheet-corrugated sheet components equal in height to the height of the said module to be formed is realized, and,
(d) heat-flanging the edges of said stacked flat sheet-corrugated sheet components to cause heat-welding of the edges of adjacent sheets together forming an edge-seam uniting the stacked sheets into a unitary structure.

* * * * *